UNITED STATES PATENT OFFICE.

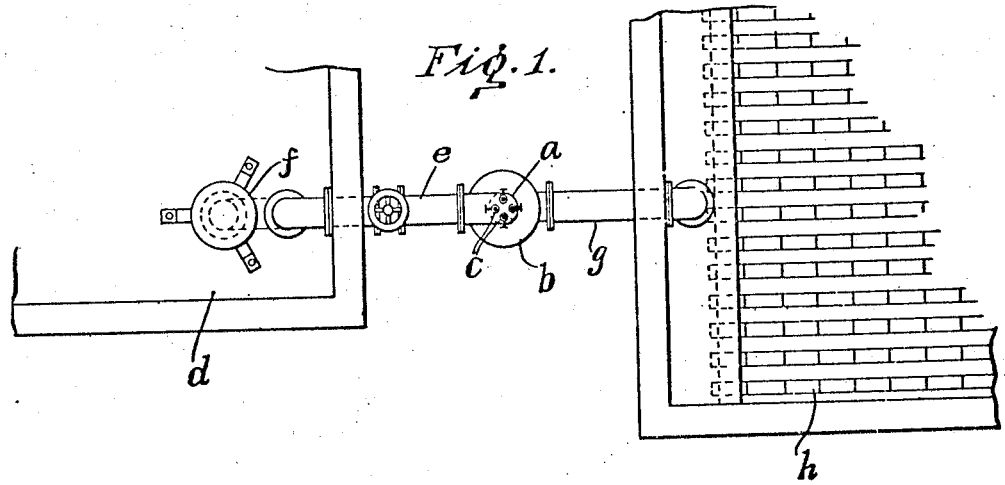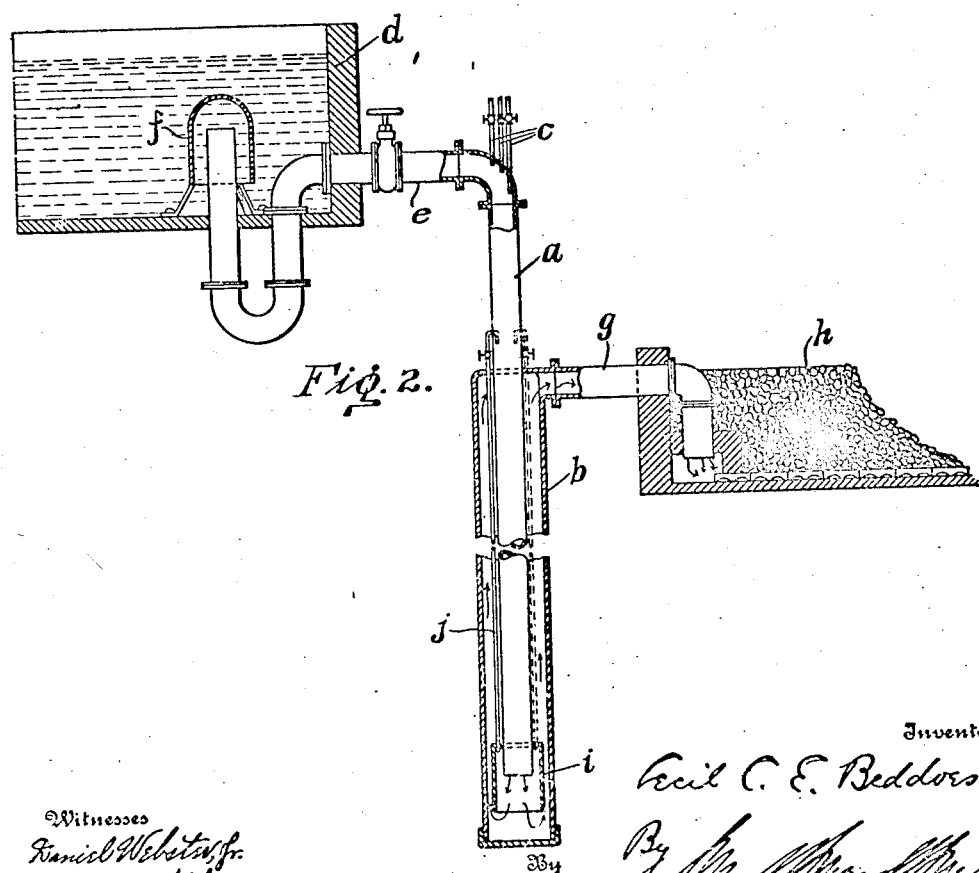

CECIL C. E. BEDDOES, OF WALLINGFORD, PENNSYLVANIA.

METHOD OF TREATING SEWAGE.

No. 895,229.    Specification of Letters Patent.    Patented Aug. 4, 1908.

Application filed March 30, 1908. Serial No. 424,080.

*To all whom it may concern:*

Be it known that I, CECIL C. E. BEDDOES, a resident of Wallingford, Delaware county, State of Pennsylvania, have invented an Improvement in Methods of Treating Sewage, of which the following is a specification.

In those methods of treating sewage in which it is subjected to the action of bacteria, it is necessary that large quantities of air should be supplied to provide the oxygen necessary to support the bacterial life, whether it be in the sewage itself or in a bed or receiver to which the sewage is delivered, and in which it is subjected to the bacterial action. As the micro-organisms to which the oxygen must be supplied are widely distributed the oxygen cannot be conveniently supplied by merely exposing the surface of a contact bed to the atmosphere. To obtain satisfactory bacterial action the oxygen must be supplied in abundance below the upper surface in those strata in which the bacteria exist. The most convenient manner, therefore, of supplying this oxygen is to introduce it into the bottom of the bed with the sewage, but heretofore difficulty has been experienced in economically supplying the oxygen sufficiently abundantly in this manner.

It is the object of my invention to produce such a combination of the air with the sewage that a sufficient volume of air will be absorbed and retained by the sewage until delivery to the bed to supply the oxygen required to properly sustain the bacteria. This result I accomplish by subjecting the sewage and air to pressure at the same time, and, as the amount of air absorbed is proportional to the pressure, it follows that the absorption of the required amount of air may be obtained by increasing to the requisite degree the pressure acting at the same time on the air and sewage. To obtain this result in the most efficient and simple manner I introduce the air into a moving column of sewage. As the pressure in this column increases in proportion to its depth, or the height of the column, the pressure on the air which is drawn in and carried with the sewage is correspondingly increased, so that the volume of air absorbed will be proportional to the height of the column of sewage. The sewage when thus aerated to the desired degree is discharged through a suitable conduit into the contact bed. As the pressure at the bed is atmospheric, the absorbed air will be released and will supply its oxygen to the bacteria. I also propose in some cases, to extract unabsorbed or free air from the lower portion of the descending column, and to reintroduce it in the form of fine particles in the upper part of the descending column. The sewage which is thus treated by the addition of air under pressure for the purpose of increasing the bacterial action is sewage which has to some extent undergone fermentation and has become a liquid containing organic matter in solution or suspension which has been subjected to hydrolytic action.

In the drawings; Figure 1 is a plan view of a form of apparatus adapted for carrying out my process of treating sewage, and Fig. 2 is a side elevation of the same with portions in vertical section.

$a$ is the pipe or conduit through which the sewage passes while it is being aerated, and $b$ is the pipe or conduit through which the same is discharged after aeration. These pipes or conduits $a$ and $b$ are arranged in a vertical or upright position and communicate at the bottom, so that the sewage entering the pipe $a$ at the top will flow downward and pass at the bottom into the pipe $b$ and then flow upward to the point of discharge. In the particular construction shown the pipe $a$ extends down through the surrounding pipe $b$.

$c\,c$ are the air nozzles which enter the pipe or conduit $a$ and supply air to the moving column of sewage therein. These nozzles open into the pipe $a$ at or near the top and thus introduce air into the top of the column of moving sewage. At this moment both the air and sewage are at atmospheric pressure, but as the sewage flows down the pipe or conduit $a$ its pressure increases,—the pressure at any point being proportional to the height of the column of liquid above such point,—and the pressure of the air which is drawn in with the moving column of sewage is correspondingly increased, so that the sewage and air in the conduit $a$ are subjected to gradually and proportionally increasing pressures as they descend. According to the well known law that the amount of gas absorbed by liquid varies directly as the pressure, it follows that the air will be absorbed in increasing quantity by the column of sewage in the conduit $a$, and that the sewage passing from the conduit $a$ into the conduit $b$ will contain an amount of air proportional to the height of the column in the conduit $a$.

In the drawings I have shown the conduit

*a* receiving sewage from a suitable tank *d* through a branch *e* supplied through a liquid sealed siphon *f*; the conduit *b* is shown as a pipe surrounding the pipe *a* and discharging at the top through a branch *g* into the base of a contact bed *h*. In this application of the invention sewage from the tank *d* flows through the siphon *f* and branch *e* into the conduit or pipe *a* and drawing in the air through the nozzle *c* carries the air down with it through the pipe *a*, subjecting it to increasing pressure and effecting the increased absorption in the manner described. On reaching the end of the pipe *a*, the sewage thus thoroughly aerated rises through the pipe *b* and is discharged through the outlet *g* below the upper surface of the bed. As the sewage rises in the pipe or conduit *b* there is of course a reduction of pressure and a tendency to release the air that has been absorbed by the sewage during its descent through the conduit *a*; the upward passage of the sewage through the conduit *b* to the bed is too rapid to permit any material quantity of the air to be freed, so that the sewage at the moment of discharge into the filter bed contains approximately the whole quantity of air that was absorbed during its descent through the pipe *a* as well as the free unabsorbed air carried in by the liquid. The increased quantity of air that is thus supplied to the filter bed with the sewage aids bacterial action by furnishing more abundantly the desired oxygen to the bacteria, whether they are in the sewage itself or in the material of the bed or receiver to which the sewage is delivered.

As all of the air drawn in with the sewage may not be absorbed when the sewage passes from the conduit *a* to the conduit *b*, it is desirable that the surplus unabsorbed air should be extracted from the conduit and reintroduced again into the moving column; for this purpose I have provided the end of the conduit or pipe *a* with an enlargement or bell *i* through which the sewage passes before entering the ascending conduit *b*. From this bell or enlargement one or more air pipes *j* lead up and reënter the conduit *a* at a higher point. Thus the free air which is released in the bell *i* may pass up through the pipe *j* and be reintroduced at a higher point into the moving column of sewage in the conduit *a*.

What I claim as new is as follows:

1. The hereindescribed process of treating sewage for the purpose of supplying the same with oxygen to support bacteria which consists in supplying air or gas to the sewage and subjecting the sewage and air or gas to pressure at the same time.

2. The hereindescribed process of treating sewage for the purpose of supplying the same with oxygen to support bacteria, which consists in supplying air or gas to the sewage and subjecting the sewage and air or gas to pressure at the same time and then subjecting the sewage so treated to bacterial action.

3. The hereindescribed process of treating sewage for the purpose of supplying the same with oxygen to support bacteria, which consists in supplying air or gas to the sewage and subjecting the sewage and air or gas at the same time to increasing pressures.

4. The hereindescribed process of treating sewage for the purpose of supplying the same with oxygen to support bacteria, which consists in supplying air or gas to the sewage and subjecting the sewage and air or gas at the same time to proportionally increasing pressures.

5. The hereindescribed process of treating sewage, which consists in supplying the same with oxygen to support bacteria by supplying air or gas to the sewage, subjecting a moving body of sewage and air or gas to pressure at the same time and then subjecting the sewage so treated to bacterial action in a state of rest.

6. The hereindescribed process of treating sewage, which consists in supplying the same with oxygen to support bacteria by supplying air or gas to the sewage, subjecting a moving body of sewage and air or gas to pressure at the same time, then relieving the pressure and subjecting the sewage to bacterial action in a state of rest.

7. The hereindescribed process of treating sewage for the purpose of supplying the same with oxygen to support bacteria, which consists in introducing air into a moving column of sewage in a closed conduit and thereby increasing the pressure and quantity of air absorbed in proportion to the height of the column of sewage through which the air is carried.

8. The hereindescribed process of treating sewage for the purpose of supplying the same with oxygen to support bacteria, which consists in causing the sewage to flow downward in a column through a closed conduit, introducing air or gas into the upper part of said moving column and thereby causing the air or gas to be drawn down with said moving sewage and to be absorbed thereby by the increase in pressure proportionally to the extent of downward movement, and finally discharging the column of sewage with the air or gas upward through a closed conduit.

9. The hereindescribed process of treating sewage for the purpose of supplying the same with oxygen to support bacteria, which consists in causing the sewage to flow downward in a column through a closed conduit, introducing air or gas into the upper part of said moving column thereby causing the air or gas to be drawn down with said moving sewage and to be absorbed thereby by the increase in pressure proportional to the extent of downward movement, conducting off the excess of unabsorbed air from the lower part of the column of moving sewage and reintroducing it into said moving column at a higher point and finally discharging the column of sewage with the air or gas upward through a closed conduit.

10. The hereindescribed process of treating sewage for the purpose of supplying the same with oxygen to support bacteria, which consists in causing the sewage to flow downward in a column through a closed conduit, introducing air or gas into the upper part of said moving column and thereby causing the same to be drawn down with said moving sewage and to be absorbed thereby by the increase in pressure proportionally to the extent of downward movement, and finally discharging the column of sewage with the air or gas into a bed and below the upper surface thereof and subjecting the same to bacterial action while in said bed.

In testimony of which invention, I have hereunto set my hand.

CECIL C. E. BEDDOES.

Witnesses:
 ALBERT PRIESTMAN,
 ERNEST HOWARD HUNTER.